United States Patent
Yanagi

(10) Patent No.: US 9,680,405 B2
(45) Date of Patent: Jun. 13, 2017

(54) ONBOARD MOTOR CONTROLLER

(71) Applicant: JTEKT CORPORATION, Osaka-shi (JP)

(72) Inventor: Takuya Yanagi, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 77 days.

(21) Appl. No.: 14/330,065

(22) Filed: Jul. 14, 2014

(65) Prior Publication Data
US 2015/0015169 A1 Jan. 15, 2015

(30) Foreign Application Priority Data
Jul. 15, 2013 (JP) ................................. 2013-147162

(51) Int. Cl.
| | | |
|---|---|---|
| *H02P 21/00* | (2016.01) | |
| *B60L 9/00* | (2006.01) | |
| *H02P 6/24* | (2006.01) | |
| *B60L 3/00* | (2006.01) | |
| *B60L 3/04* | (2006.01) | |
| *B60W 10/06* | (2006.01) | |
| *B60W 10/08* | (2006.01) | |
| *H02P 29/024* | (2016.01) | |
| *B60K 6/34* | (2007.10) | |

(52) U.S. Cl.
CPC .............. *H02P 6/24* (2013.01); *B60L 3/0007* (2013.01); *B60L 3/04* (2013.01); *B60W 10/06* (2013.01);
(Continued)

(58) Field of Classification Search
CPC .......... B60L 11/06; B60L 3/04; B60L 3/0007; H02P 6/24; H02P 29/027; Y02T 10/642; B60W 10/06; B60W 10/08; B60K 6/34
(Continued)

(56) References Cited

U.S. PATENT DOCUMENTS

| 6,417,579 B1 | 7/2002 | Lehnst et al. | |
|---|---|---|---|
| 2006/0071625 A1* | 4/2006 | Nakata | B25J 9/1633 318/568.12 |

(Continued)

FOREIGN PATENT DOCUMENTS

| JP | 06-245323 | * | 2/1994 | |
|---|---|---|---|---|
| JP | 06245323 | * | 2/1994 | .............. B60L 11/06 |

(Continued)

OTHER PUBLICATIONS

Extended European Search Report issued on Sep. 18, 2015 in Patent Application No. 14176672.5.

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

There is provided an onboard motor controller that starts a failsafe process in short time at a vehicle collision. A control circuit in the motor controller acquires an acceleration detected by an acceleration sensor. When the acceleration is equal to or higher than a prescribed value, the control circuit determines that a collision of the vehicle has occurred, and executes a switching process of a control mode of a motor. The control circuit immediately switches the control mode of a motor from voltage phase control to current vector control when the collision is detected. The control circuit reads current values from current detectors. When an overcurrent is detected, the control circuit executes a failsafe process to turn off the MOSFETs of an inverter. The control circuit stops a supply of electricity to the inverter by turning off a power supply relay, thereby stopping the rotation of the motor.

3 Claims, 4 Drawing Sheets

(52) U.S. Cl.
CPC ............ *B60W 10/08* (2013.01); *H02P 29/027* (2013.01); *B60K 6/34* (2013.01); *Y02T 10/642* (2013.01)

(58) Field of Classification Search
USPC .............................. 318/400.02, 400.09, 380
See application file for complete search history.

(56) References Cited

U.S. PATENT DOCUMENTS

| | | | | |
|---|---|---|---|---|
| 2007/0278986 | A1 | 12/2007 | Okamura | |
| 2011/0050136 | A1* | 3/2011 | Sumi | B60L 3/04 318/400.3 |
| 2012/0161689 | A1* | 6/2012 | Yamasaki | B62D 5/0406 318/724 |
| 2013/0009575 | A1* | 1/2013 | Yoo | H02P 21/0035 318/400.02 |
| 2013/0063057 | A1* | 3/2013 | Takahashi | H02P 21/14 318/400.02 |
| 2014/0309831 | A1* | 10/2014 | Tanaka | B60K 6/34 701/22 |

FOREIGN PATENT DOCUMENTS

| | | |
|---|---|---|
| JP | 6-245323 | 9/1994 |
| JP | 2009-254119 | 10/2009 |

\* cited by examiner

F I G . 2
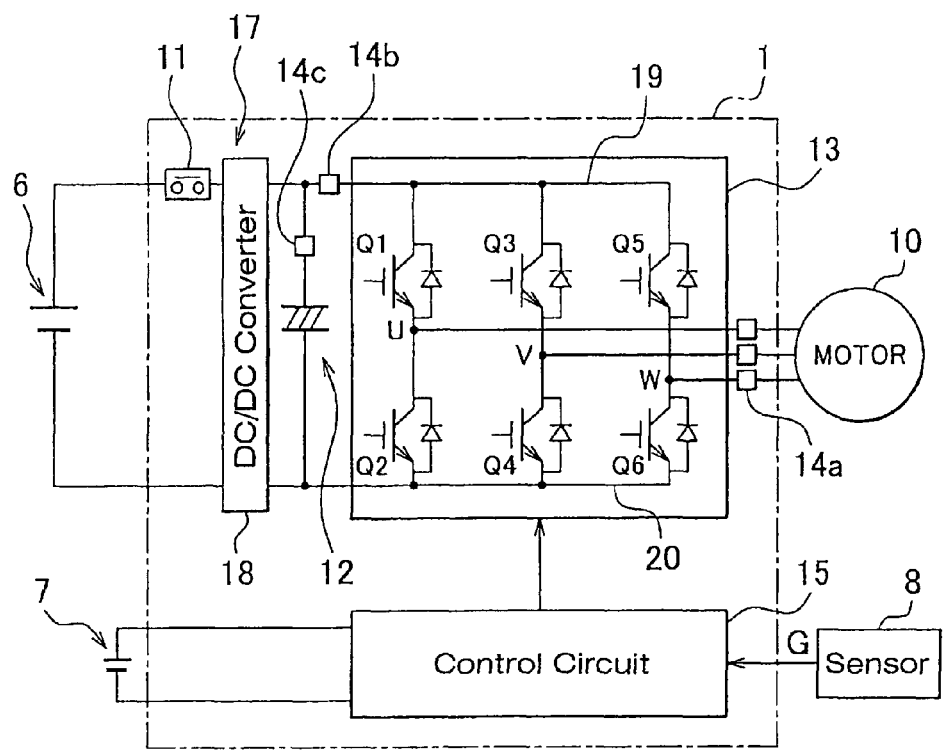

ONBOARD MOTOR CONTROLLER

INCORPORATION BY REFERENCE

The disclosure of Japanese Patent Application No. 2013-147162 filed on Jul. 15, 2013 including the specification, drawings and abstract, is incorporated herein by reference in its entirety.

BACKGROUND OF THE INVENTION

1. Field of the Invention

The invention relates to an onboard motor controller.

2. Description of Related Art

There is a conventional electric vehicle that is provided with an electricity storage device, such as a secondary battery or a capacitor, and that travels by driving an electric motor, which serves as a traction motor, using driving force generated from electricity stored in the electricity storage device. Examples of the electric vehicle include a hybrid vehicle and an electric automobile. The electric vehicle includes a motor controller that determines whether the rotational state of the electric motor is appropriate on the basis of a command value and drives the electric motor on the basis of the determination result.

As described in Japanese Patent Application Publication No. 2009-254119 (JP 2009-254119 A), the motor controller includes, as a device that detects a collision of a vehicle in order to execute a failsafe process at the time of the collision of the vehicle, a device that determines whether an abnormality due to the collision has occurred in the electric motor on the basis of for example, phase currents or phase voltages of the electric motor and that executes a process of stopping the driving of the electric motor when it is determined that an abnormality has occurred. Japanese Patent Application Publication No. 6-245323 (JP 6-245323 A) describes that when an acceleration sensor detects a high acceleration and thus a collision of a vehicle is detected, a supply of electricity to an engine computer and an electricity generator controller is blocked to stop the driving of the engine and a supply of field current to the electricity generator.

In an electric vehicle provided with the motor controller, electricity may be directly supplied to the motor controller through the use of a high-voltage traction battery that is a high-capacity electricity storage mechanism. When a collision occurs while the electric vehicle is travelling, it is necessary to immediately block a supply of electricity to the motor controller to stop the driving of the electric motor and to stop the driving of the engine and a supply of field current to the electricity generator in order to avoid a risk that electric shock will be given to a driver due to a high-voltage or occurrence of a fire due to heat generated from the electric motor. In order to stop the driving of the electric motor, on the basis of the information within a motor control system including a current sensor, the control mode of the motor is switched from voltage phase control by rectangular wave driving (one-pulse control) adopted to enlarge a driving range at a high rotational speed, to current vector control based on a sinusoidal pulse width modulation control (hereinafter, abbreviated to "sinusoidal PWM control") in a low rotational speed region. However, with the above-described method of switching the control mode, the switching time becomes longer depending on a motor constant and it takes a long time to receive a response of the current sensor or to determine a detected current. This raises a possibility that, at the time of a collision, it will not be possible shift to a failsafe process within a short period of time.

SUMMARY OF THE INVENTION

One object of the invention is to provide an onboard motor controller that makes it possible to shorten the time until a failsafe process is executed at the time of a collision of a vehicle.

An onboard motor controller according to an aspect of the invention includes: a motor drive circuit that includes a plurality of switching elements, and that supplies a drive current to an electric motor based on a command value; a power supply circuit that is connected to a high-voltage direct-current power source for driving the electric motor, and that supplies electricity to the motor drive circuit; and a control circuit that controls the motor drive circuit. The control circuit has a plurality of control modes for controlling driving of the electric motor. The control circuit includes a collision detecting unit that detects a collision of a vehicle based on a signal from a sensor provided in the vehicle and a control mode switching unit that switches the control mode. The control mode switching unit switches the control mode immediately upon detection of the collision of the vehicle.

According to the above aspect, in an electric vehicle that travels using a high-voltage power source and using the electric motor as a power source, the control mode of the motor controller is switched when a collision of the vehicle is detected on the basis of the value detected by the acceleration sensor installed in the vehicle. Thus, when an overcurrent is detected, it is possible to execute a failsafe process within a short time without depending on a response of a current sensor. Thus, it is possible to shorten the control time from the detection of the collision of the vehicle until the stop of the electric motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a diagram illustrating the circuit configuration of the onboard motor controller in FIG. 1;

DETAILED DESCRIPTION OF EMBODIMENTS

Figure 1:
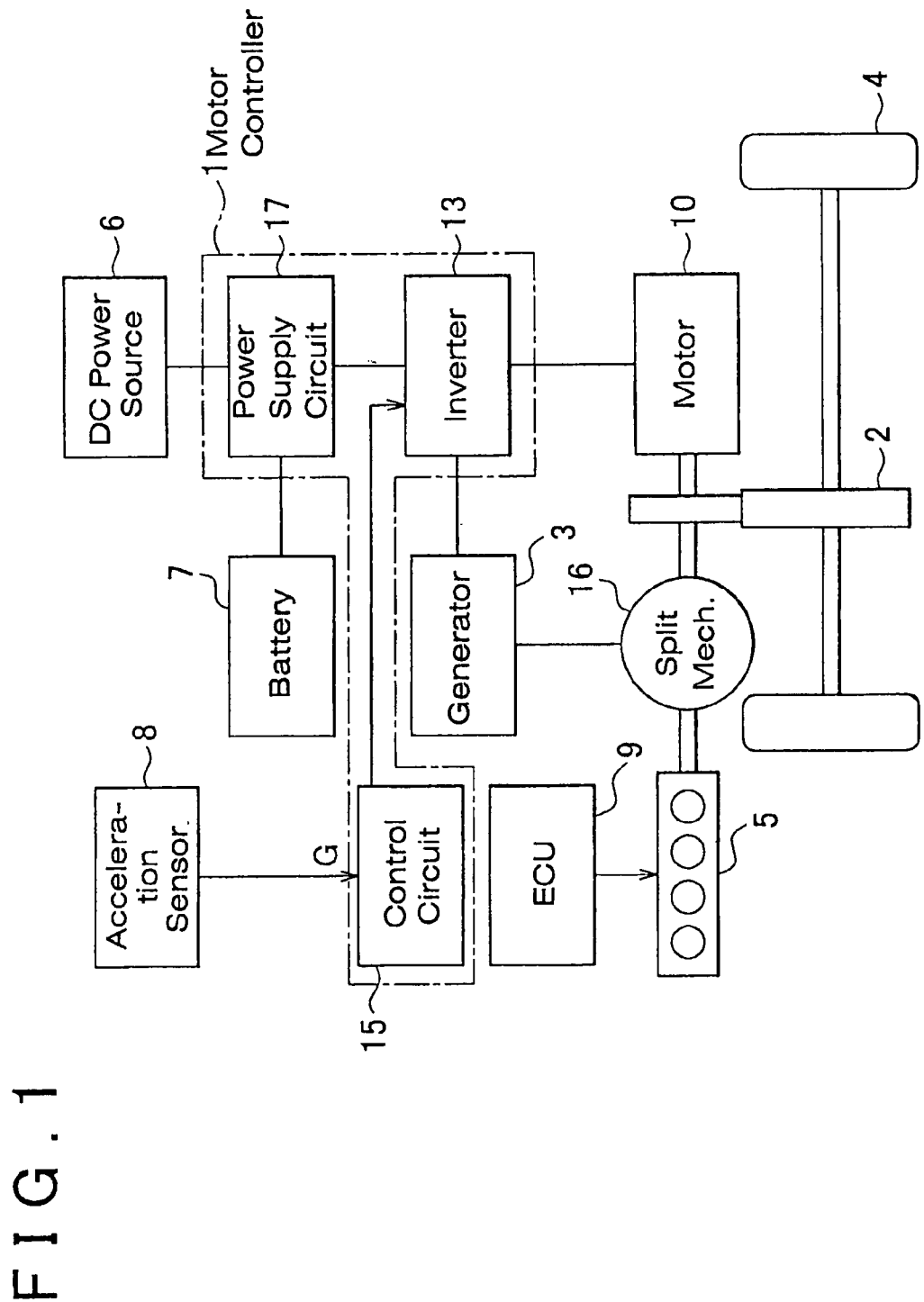
FIG. 1 is a block diagram illustrating the configuration of main portions of a vehicle provided with an onboard motor controller according to an embodiment of the invention.

Hereinafter, an onboard motor controller according to an embodiment of the invention will be described with reference to the accompanying drawings. FIG. 1 is a block diagram illustrating the configuration of main portions of a vehicle provided with the onboard motor controller according to the embodiment of the invention. The onboard motor controller (hereinafter, referred to as "motor controller") 1 illustrated in FIG. 1 includes an inverter 13, which may function as a motor drive circuit, a power supply circuit 17, and a control circuit 15. The vehicle includes a gasoline engine (hereinafter, referred to as "engine") 5 and an electric motor 10, which serve as traction power sources. The engine 5 and the electric motor 10 are connected to a generator 3, which is an electricity generator, via a power split mechanism 16. An output shaft of the power split mechanism 16 is connected to driving wheels 4 via a speed reducer 2. Thus, there is adopted a series-parallel hybrid system in which the ratio between the driving force to be transmitted from the engine 5 to the driving wheels 4 and the driving force to be transmitted from the electric motor 10 to the driving wheels 4 is variable.

For example, a three-phase brushless motor is used as the traction electric motor 10. As the electric motor 10, there is adopted a permanent magnet synchronous motor such as an IPM motor including an interior permanent magnet rotor in which permanent magnets are fixedly embedded in a rotor core, or an SPM motor including a surface permanent magnet rotor in which permanent magnets are secured to the surface of a rotor core. The IPM motor is used as a main traction motor that is required to generate high torque.

The generator 3 and the electric motor 10 are electrically connected, via the inverter 13 and the power supply circuit 17, to a high-voltage battery (direct-current (DC) power source) 6 with a high-voltage (for example, 300V), which is provided as a main battery. The high-voltage battery 6 serves as a high-voltage traction battery that supplies electricity to the electric motor 10, which serves as a traction motor of a hybrid vehicle or an electric automobile. A low-voltage battery 7 with a low-voltage (for example, 12V), which serves as an auxiliary battery, is electrically connected to the power supply circuit 17. The low-voltage battery 7 is electrically connected to various auxiliary devices (such as various lights or electronic devices) such as an actuator of an electricity steering system, and is used as an electricity supply source for the auxiliary devices. As illustrated in FIG. 2, the motor controller 1 boosts a DC voltage supplied from the high-voltage battery 6 to a higher voltage (for example, 500V) through the use of a DC/DC converter 18 in the power supply circuit 17 and then supplies the boosted DC voltage to the inverter 13, or supplies the DC voltage as it is (without boosting) to the inverter 13, depending on the design of the inverter 13 that is the motor drive circuit.

The operation of the engine 5 is controlled by an engine controller (engine ECU) 9, and the electricity generation amount and the electricity consumption of the generator 3 and the electric motor 10 are adjusted by controlling the state of the inverter 13 with the use of the control circuit 15 in the motor controller 1. The motor controller 1 is connected to an acceleration sensor 8 that is installed at a position outside the motor controller 1 and in the vehicle and that detects a lateral acceleration G applied to the vehicle. The installation location of the acceleration sensor is, for example, at a vehicle body, and examples of the type of the acceleration sensor to be used include an electrostatic type, a piezoelectric type, and a resistive type. The control circuit 15 detects an acceleration G within a short time (for example, approximately several milliseconds) on the basis of an output signal from the acceleration sensor 8.

The motor controller 1 is supplied with electricity from the high-voltage battery 6 and controls the driving of the electric motor 10. The control circuit 15 computes a current command value on the basis of a detected motor rotation angle and motor phase currents, and outputs generated control signals to the inverter 13. The electric motor 10 generates motor torque when the electric motor 10 is driven to be rotated by the motor controller 1.

FIG. 2 is a diagram illustrating the circuit configuration of the motor controller 1 illustrated in FIG. 1. The motor control circuit illustrated in FIG. 2 includes the power supply circuit 17, the control circuit 15, and the inverter 13. The motor control circuit is disposed in the motor controller 1 and is connected to the high-voltage battery 6, which is a high-voltage power source, and the electric motor 10. A control voltage (for example, 12V), which is used as a power source of the control circuit 15, is supplied from the low-voltage battery 7, which is a low-voltage power source. The voltage of the low-voltage battery 7 is, for example, 12V and the low-voltage battery 7 is mounted as an auxiliary battery independent of the high-voltage battery 6. Alternatively, the control voltage may be supplied from the high-voltage battery 6 via, for example, a DC/DC converter.

As illustrated in FIG. 2, the electric motor 10 is a three-phase brushless motor having three-phase coils (U-phase coil, V-phase coil, and W-phase coil) not illustrated. The power supply circuit 17 includes a power supply relay 11, the DC/DC converter 18, and a smoothing capacitor 12. The power supply relay 11 is disposed at an input part of the motor controller 1, and is a power supply switch that makes the switchover between the state where the smoothing capacitor 12 and the inverter 13 are connected to the high-voltage battery 6 and the state where the smoothing capacitor 12 and the inverter 13 are disconnected from the high-voltage battery 6. The power supply relay 11 is in an on-state (connected state) when the electric motor 10 is operating, and is in an off-state (disconnected state) when the electric motor 10 is at a standstill.

The smoothing capacitor 12 is disposed between a power wire 19 and an earth wire 20. The smoothing capacitor 12 accumulates electric charge and discharges the accumulated electric charge when the amount of current flowing from the high-voltage battery 6 to the inverter 13 is insufficient. In this way, the smoothing capacitor 12 serves as a capacitor that absorbs current ripples and smoothes the source current and the source voltage of the inverter 13. In the motor controller 1 according to the present embodiment, after the power supply relay 11 is turned off, the electric charge accumulated in the smoothing capacitor 12 is discharged via a discharge resistor by turning on a switch (not illustrated). For example, a metal-oxide semiconductor field effect transistor (MOSFET) is used as the switch.

An inrush current prevention circuit (not illustrated) including a MOSFET and a limiting resistor is provided. The inrush current prevention circuit prevents an inrush current from flowing immediately after the power supply relay 11 is turned on, and charges the smoothing capacitor 12 via the limiting resistor when the MOSFET is in an off-state. The power supply circuit 17 includes a source current detector 14b and a smoothing capacitor current detector 14c, which serve as current sensors and are used as detectors that detect deterioration of components or abnormalities of devices.

The inverter 13 includes six MOSFETs Q1, Q2, Q3, Q4, Q5, Q6, which serve as switching elements. Three circuits formed by connecting corresponding two of the six MOSFETs Q1, Q2, Q3, Q4, Q5, Q6 in series are arranged in parallel between the power wire 19 and the earth wire 20. The connection points at which the paired MOSFETs are connected to each other are directly connected respectively to one ends of the U-phase coil, the V-phase coil, and the W-phase coil of the electric motor 10. The other ends of the three-phase coils of the electric motor 10 are connected to a single connection point (neutral point).

The control circuit 15 controls the six MOSFETs Q1, Q2, Q3, Q4, Q5, Q6 included in the inverter 13. More specifically, the motor phase currents and the motor rotation angle are input into the control circuit 15. Then, the control circuit 15 determines target values (target currents) of the three-phase drive currents (U-phase current, V-phase current, and W-phase current) to be supplied to the electric motor 10 on the basis of the received data, and outputs PWM signals for causing the currents (phase currents) detected by the phase current detector 14a to coincide with the target currents. The PWM signals for three phases output from the control circuit 15 are supplied to gate terminals of the six MOSFETS Q1, Q2, Q3, Q4, Q5, Q6 included in the inverter 13.

A signal indicating the acceleration G detected by the acceleration sensor 8 (see FIG. 1) installed in the vehicle is input into the control circuit 15, and a collision of the vehicle is detected from the value of the acceleration G. The high-voltage battery 6 is a traction battery with a high-voltage (for example, 300V) for driving the traction motor of a hybrid vehicle or an electric automobile. As the high-voltage battery 6, for example, a nickel-hydrogen battery or a lithium-ion battery is adopted.

In the above-described configuration, a high-voltage from the high-voltage battery 6 is supplied to the inverter 13 in a normal state. When a collision of the vehicle occurs and the control circuit 15 recognizes the collision of the vehicle on the basis of the value of the acceleration G output from the acceleration sensor 8, the supply of electricity is stopped by turning off the power supply relay 11 to stop the rotation of the electric motor 10. Because the acceleration G at the time of a collision is considerably higher than the acceleration at the time of sudden starting or at the time of sudden acceleration in the normal state, the collision can be easily detected from the signal from the acceleration sensor 8.

Figure 3:
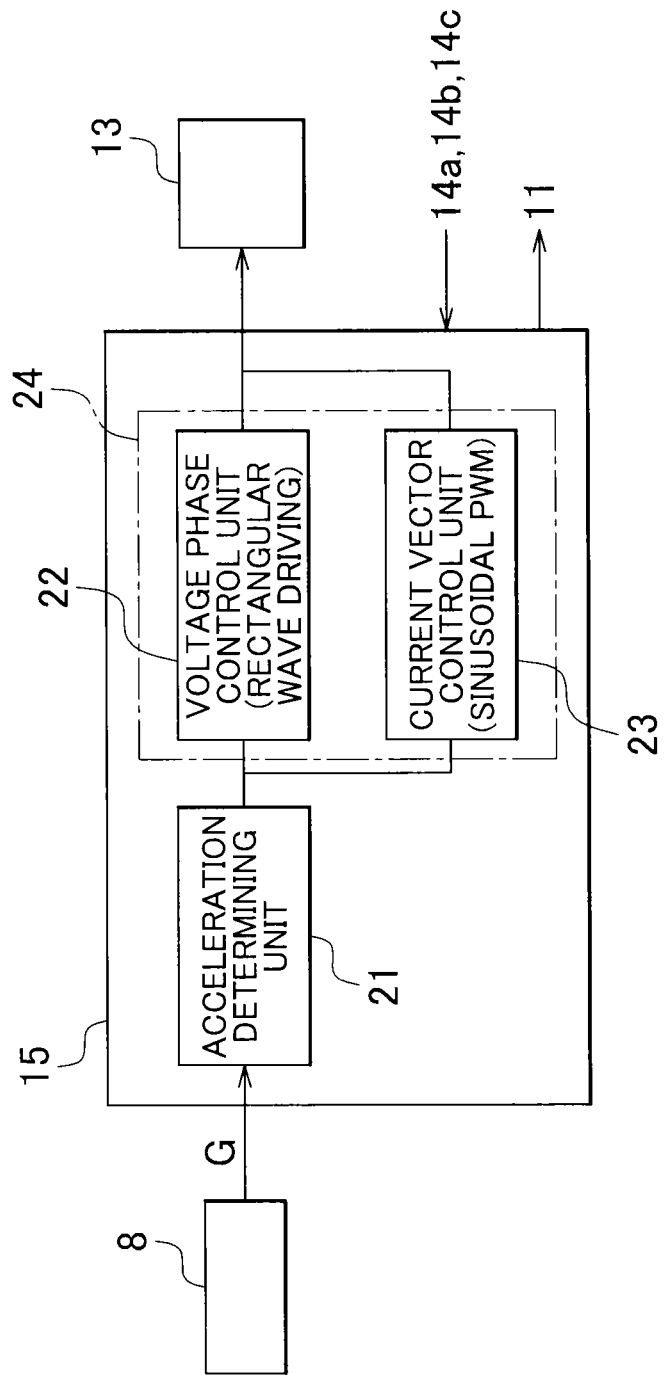
FIG. 3 is a block diagram illustrating the configuration of a control circuit in FIG. 2.

FIG. 3 is a block diagram illustrating the configuration of the control circuit 15 illustrated in FIG. 2. As illustrated in FIG. 3, the control circuit 15 includes an acceleration determining unit (collision detecting unit) 21 that determines a collision from the acceleration G received from the acceleration sensor 8, and a control mode switching unit 24 that makes the switchover between two control units, that is, a voltage phase control unit 22 that executes rectangular wave driving (one-pulse control) and a current vector control unit 23 that executes sinusoidal PWM control, namely, that switches the control mode, on the basis of the value of the acceleration G. The control circuit 15 receives the acceleration G and the detected current values from the phase current detector 14a, the source current detector 14b, and the smoothing capacitor current detector 14c, and outputs an on-off signal for the power supply relay 11. The control circuit 15 executes the current vector control in a low-and-medium rotational speed region and executes the voltage phase control in a high rotational speed region, thereby enlarging the driving range of the motor. In the voltage phase control, because the voltage is constant, torque is controlled by controlling the phase of a rectangular wave.

As described above, the control circuit 15 selects one of the voltage phase control and the current vector control depending on the acceleration G from the acceleration sensor 8, and outputs the controls signals to the inverter 13 on the basis of the computed current command value. The control circuit 15 executes the current vector control in a region where the electric motor 10 is rotating at a low to medium rotational speed and generates high torque, and executes the rectangular wave control in a region where the electric motor 10 is rotating at a high rotational speed and generates low torque. The torque output from the electric motor 10 undergoes substantially constant transition on the low-and-medium rotational speed region side. By executing the voltage phase control on the high rotational speed region side, the output torque is gradually reduced until the rotational speed is increased to a high rotational speed. The rotational speed corresponding to the boundary between the region where the voltage phase control is executed and the region where the current vector control is executed is reduced as the required output torque becomes higher.

Figure 4:
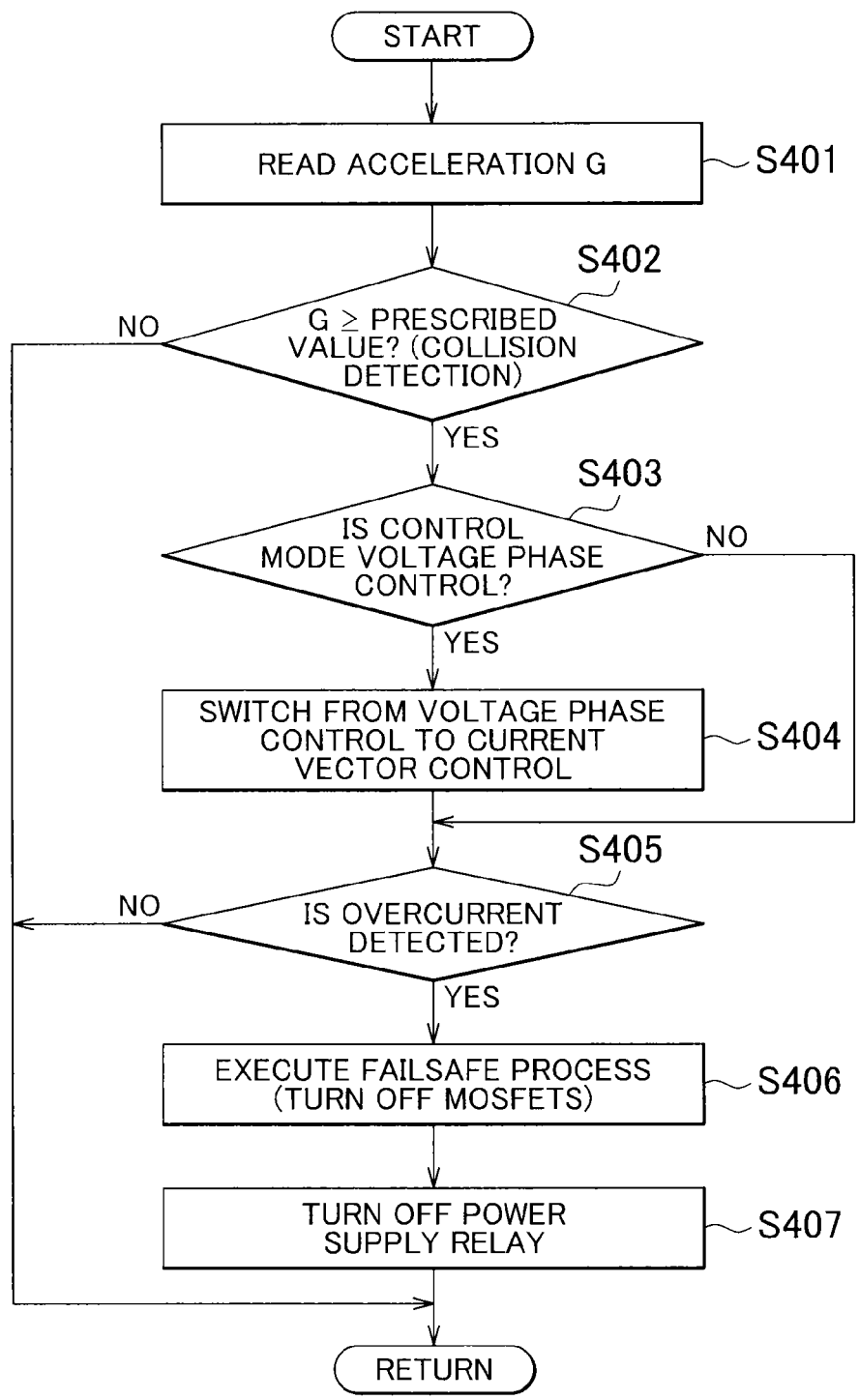
FIG. 4 is a control flowchart illustrating the process executed by the control circuit at the time of a collision of the vehicle.

FIG. 4 is a flowchart illustrating the procedure at the time of a collision of the vehicle, which is executed by the control circuit 15. In the present embodiment, the control circuit 15 executes the processes in steps S401 to S407 of the flowchart illustrated in FIG. 4. The following procedure in the flowchart is executed at prescribed time intervals. As illustrated in FIG. 4, the control circuit 15 of the motor controller 1 first reads the acceleration G detected by the acceleration sensor 8 (step S401).

Then, it is determined whether the detected acceleration G is higher than or equal to a prescribed value (step S402). When it is determined that the acceleration G is higher than or equal to the prescribed value (YES in step S402), it is determined that a collision of the vehicle has occurred and the switching process at the time of a collision of the vehicle is executed in step S403 to step S407. When it is determined that the acceleration G is lower than the prescribed value (NO in step S402), the procedure at the time of a collision of the vehicle is terminated without execution of the following processes.

Subsequently, the control circuit 15 determines whether the control mode is the voltage phase control (one-pulse control) (step S403). When it is determined that the control mode is the voltage phase control (YES in step S403), the control circuit 15 switches the control mode from the voltage phase control to the current vector control based on the sinusoidal PWM control (step S404). When it is determined that the control mode is not the voltage phase control (NO in step S403), the control circuit 15 proceeds on to step S405. Then, the control circuit 15 reads current values from the phase current detector 14a, the source current detector 14b, and the smoothing capacitor current detector 14c, and determines whether an overcurrent is detected (step S405).

When it is determined that an overcurrent is detected (YES in step S405), the control circuit 15 executes a failsafe process (turns off the MOSFETs in the present embodiment) (step S406). In the failsafe process, the MOSFETS Q1, Q2, Q3, Q4, Q5, Q6 of the inverter 13 are turned off. When it is determined that an overcurrent is not detected (NO in step S405), the procedure at the time of a collision of the vehicle is terminated without execution of the following processes. In this case, because the failsafe process is not executed, the vehicle is allowed to keep travelling in the limp home mode by the driving of the electric motor 10 even after the collision is detected.

Subsequently, the control circuit 15 turns off the power supply relay 11 to stop the supply of electricity to the inverter 13 (step S407), and terminates the procedure at the time of a collision of the vehicle. Thus, the rotation of the electric motor 10 is stopped.

Operations and advantageous effects of the motor controller 1 according to the present embodiment having the above-described configuration will be described below.

With the above-described configuration, in an electric vehicle that travels using the high-voltage battery 6 with a high-voltage and using the electric motor 10 as a power source, the control mode of the motor controller 1 is switched when a collision of the vehicle is detected on the basis of the value (acceleration G) detected by the acceleration sensor 8 installed in the vehicle. At this time, when the control mode executed at the time of detecting the collision of the vehicle is the voltage phase control by the rectangular wave driving (one-pulse control) in the high rotational speed (low torque) region, the control circuit 15 of the motor controller 1 immediately switches the control mode to the current vector control based on the sinusoidal PWM control in the low-and-medium rotational speed (high torque) region, and outputs the controls signals generated on the basis of the computed current command value to the inverter 13.

When an overcurrent is detected by any one of the phase current detector 14a, the source current detector 14b, and the smoothing capacitor current detector 14c after the control mode is switched to the current vector control, the control circuit 15 immediately stops the operations of the MOSFETS Q1, Q2, Q3, Q4, Q5, Q, which are the switching elements in the inverter 13, and terminates the connection between the high-voltage battery 6 and the inverter 13 to stop the supply of electricity by the power supply relay 11 that establishes or terminates the connection between the high-voltage battery 6 and the inverter 13. Thus, the rotation of the electric motor 10 is stopped.

Thus, it is possible to immediately shift to the current vector control without depending on the information (for example, a response of the current sensor that depends on the motor time constant) in the motor control system at the time of a collision of the vehicle, immediately after detecting a collision based on the acceleration G detected by the acceleration sensor 8. In addition, when an overcurrent is detected after detecting the collision, it is possible to immediately cope with the overcurrent, thereby shortening the time until execution of the failsafe process (turning off of the MOSFETS) is started. As a result, it is possible to shorten the control time from the detection of the collision of the vehicle to the stop of the electric motor 10. When an overcurrent is not detected, the vehicle is allowed to travel in the limp home mode by the electric motor 10 even after the detection of the collision.

As described above, according to the embodiment of the invention, it is possible to provide the onboard motor controller that makes it possible to shorten the time until the failsafe process is executed by promptly switching the control mode at the time of a collision of the vehicle.

While the embodiment of the invention has been described above, the invention may be implemented in various other embodiments.

In the above-described embodiment, a collision is detected with the use of the acceleration sensor 8 installed in the vehicle. However, the invention is not limited to this configuration. In other embodiments, a collision may be detected by an operation of an airbag or the like or a method based on another collision detection signal may be adopted. The control mode may be switched upon detection of a stop of a supply of source voltage from the high-voltage battery 6 along with detection of the collision.

In the above-described embodiment, the control mode is switched to the current vector control immediately after a collision is detected, and the failsafe process is executed upon detection of an overcurrent. However, the invention is not limited to this configuration. By immediately switching the control mode at the time of detection of a malfunction (for example, a malfunction of the control circuit) other than detection of an overcurrent, it is possible to shorten the time until the failsafe process is executed after the collision is detected.

In the above-described embodiment, a commonly-used mechanical relay is adopted as the power supply relay 11 to execute the on-off control. However, the invention is not limited to this configuration. In another embodiment, a bidirectional-blockable semiconductor switch (for example, a switch including a plurality of MOSFETS) may be used to execute an on-off operation.

In the above-described embodiment, in the motor controller 1 that drives the traction electric motor 10 used for an electric vehicle such as a hybrid vehicle, the control mode is immediately switched from the voltage phase control (one-pulse control) by the rectangular wave driving to the current vector control based on the sinusoidal PWM control at the time of a collision of the vehicle to shorten the time from the detection of the collision to execution of the failsafe process. However, the invention is not limited to this configuration. In another embodiment, the invention may be applied to another device (for example, a vehicle rear-wheel driving system or an electric oil pump) that uses an electric motor.

What is claimed is:

1. An onboard motor controller comprising:
   a motor drive circuit that includes a plurality of switching elements, and that supplies a drive current to an electric motor based on a command value;
   a power supply circuit that is connected to a high-voltage direct-current power source for driving the electric motor, and that supplies electricity to the motor drive circuit; and
   a control circuit that controls the motor drive circuit, wherein
   the control circuit has a plurality of control modes for controlling driving of the electric motor, and includes a collision detecting unit that detects a collision of a vehicle based on a signal from a sensor provided in the vehicle and a control mode switching unit that switches the control mode, and
   the control mode switching unit switches the control mode upon detection of the collision of the vehicle,
   wherein, when an overcurrent is detected through at least one of a detection of phase currents of the electric motor and a detection of a source current after the control mode is switched, the control circuit stops operations of the switching elements in the motor drive circuit, and then terminates connection between the high-voltage direct-current power source and the motor drive circuit to stop a supply of electricity by a power supply relay that establishes or terminates connection between the high-voltage direct-current power source and the motor drive circuit.

2. The onboard motor controller according to claim 1, wherein the control circuit switches the control mode from voltage phase control to current vector control upon detection of the collision.

3. The onboard motor controller according to claim 1, wherein the power supply relay is a bidirectional-blockable semiconductor switch.

* * * * *